United States Patent
Wilding et al.

(10) Patent No.: US 11,932,236 B2
(45) Date of Patent: Mar. 19, 2024

(54) METHOD FOR OPERATING A MOTOR VEHICLE, MOTOR VEHICLE, AND TRANSMISSION DEVICE

(71) Applicant: AUDI AG, Ingolstadt (DE)

(72) Inventors: Werner Wilding, Walting (DE); Malte Möller, Mitterfeld (DE)

(73) Assignee: Audi AG, Ingolstadt (DE)

( * ) Notice: Subject to any disclaimer, the term of this patent is extended or adjusted under 35 U.S.C. 154(b) by 523 days.

(21) Appl. No.: 16/471,295

(22) PCT Filed: Jan. 24, 2018

(86) PCT No.: PCT/EP2018/051653
§ 371 (c)(1),
(2) Date: Jun. 19, 2019

(87) PCT Pub. No.: WO2018/162140
PCT Pub. Date: Sep. 13, 2018

(65) Prior Publication Data
US 2020/0017100 A1    Jan. 16, 2020

(30) Foreign Application Priority Data
Mar. 9, 2017 (DE) .......................... 102017203904.3

(51) Int. Cl.
*B60W 30/06*    (2006.01)
*G06Q 10/02*    (2012.01)

(52) U.S. Cl.
CPC ............. *B60W 30/06* (2013.01); *G06Q 10/02* (2013.01); *B60W 2554/00* (2020.02); *B60W 2556/45* (2020.02)

(58) Field of Classification Search
CPC ............. B60W 30/06; B60W 2554/00; B60W 2556/45; G06Q 10/02
See application file for complete search history.

(56) References Cited

U.S. PATENT DOCUMENTS 8,423,275 B1    4/2013    Kandal
9,582,998 B2    2/2017    Stefan et al.
(Continued)

FOREIGN PATENT DOCUMENTS

CN    104843066 A    8/2015
CN    105931490 A    9/2016
(Continued)

OTHER PUBLICATIONS

International Preliminary Report on Patentability directed to related International Patent Application No. PCT/EP2018/051653, dated Apr. 25, 2019, with attached English-language translation; 11 pages.
(Continued)

*Primary Examiner* — Vivek D Koppikar
*Assistant Examiner* — Jeffrey R Chalhoub
(74) *Attorney, Agent, or Firm* — Sterne, Kessler, Goldstein & Fox P.L.L.C.

(57) ABSTRACT

A method for operating a motor vehicle with regard to a parking operation to be carried out in a parking space, wherein the motor vehicle comprises a vehicle system designed to detect and select the parking space to be used from a plurality of candidate parking options, wherein at least one candidate parking option is associated with a transmitting device, from which the motor vehicle receives permissibility information describing the permissibility of parking the motor vehicle on the candidate parking option and/or of driving through at least a portion of a path leading to the candidate parking option, wherein the selection of the parking space to be used occurs dependent on the permissibility information.

11 Claims, 2 Drawing Sheets

(56) References Cited

U.S. PATENT DOCUMENTS

2012/0044091 A1    2/2012  Kim et al.
2014/0320318 A1*  10/2014  Victor .................. G05D 1/0234
                                                            340/932.2

FOREIGN PATENT DOCUMENTS

| | | |
|---|---|---|
| DE | 102010020135 A1 | 11/2011 |
| DE | 102011009559 A1 * | 8/2012 .......... B60L 11/1861 |
| DE | 102011118726 A1 | 5/2013 |
| DE | 102013215260 A1 | 2/2015 |
| DE | 102015003888 A1 | 9/2016 |
| DE | 102015206822 A1 * | 10/2016 |
| DE | 102015211514 A1 | 12/2016 |
| EP | 2602777 A1 | 6/2013 |
| EP | 2772876 A1 | 9/2014 |
| ES | 2435399 B1 | 11/2014 |
| JP | 2003281697 A * | 10/2003 |

OTHER PUBLICATIONS

International Search Report and Written Opinion of the International Searching Authority directed to related International Patent Application No. PCT/EP2018/051653, dated Apr. 19, 2018, with attached English-language translation; 17 pages.

* cited by examiner

METHOD FOR OPERATING A MOTOR VEHICLE, MOTOR VEHICLE, AND TRANSMISSION DEVICE

TECHNICAL FIELD

The present disclosure relates to a method for operating a motor vehicle with regard to a parking operation to be carried out in a parking space, wherein the motor vehicle has a vehicle system which is designed to detect and select the parking space to be used from a plurality of candidate parking options. The present disclosure additionally relates to a motor vehicle and transmitting device.

BACKGROUND

Conventional parking assistance systems can detect parking spots or parking options for a motor vehicle and/or can also automatically support and/or carry out at least part of the stopping operation, i.e. the parking operation. In this case, environmental sensors of the motor vehicle are used, in particular, to detect free parking spots as well as candidate parking options and, in particular, to measure them. If the parking spot is large enough so that the motor vehicle can park in it, said parking spot can be recommended to the driver as a parking space and/or an automatic parking operation can be initiated, since the parking spot has already been measured anyway.

DE 10 2011 118 726 A1 discloses by way of example a method for detecting a parking spot for a motor vehicle, a parking assistance system and a motor vehicle having a parking assistance system. In this case, a geometric parameter of the parking spot is determined on the basis of sensor data of a sensor device of the parking assistance system, and further environmental information of the motor vehicle, which is different from the sensor data, is recorded by means of the parking assistance system. The parking spot is detected on the basis of the geometric parameter, taking into account the additional environmental information. The additional environmental information can be determined on the basis of map data of the navigation system and/or on the basis of a camera image, for example, in order to detect a no-parking zone by using traffic sign recognition.

In general, it can therefore be said that vehicle systems that assist in parking the motor vehicle, i.e. in the overall preparation and/or execution of a parking operation, always encounter problems when supposed parking options, i.e. parking spots or parking options, are not allowed to be used, for example, because it is an access road for fire brigades, a driveway, a time-limited parking option and/or a no-parking zone. Such situations are usually indicated with a simple street sign. The prohibition or restriction is either signposted directly to a defined parking space or marked by zones (for example, no-stopping zones). A motor vehicle driver in control of his motor vehicle who is attentively observing the environment can respond to these prohibition signs accordingly.

Many current motor vehicles with a parking mode are also dependent on the fact that ultimately a human being makes the decision as to whether a parking option detected by the motor vehicle may be used. In such systems, the sensor system initially only determines whether the size of the parking spot is large enough, and if so, whether there is a lateral boundary, for example, a sidewalk. In such basic vehicle systems, the additional or sole sensory detection of parking options is primarily based on three components that together should make possible the verification of candidate parking options as a usable parking space. These components are on the one hand the detection and evaluation of the environment with camera data, on the other hand, the measurement by ultrasound and finally the comparison with digital map material, as described by way of example in the cited DE 10 2011 118 726 A1.

Disadvantages occur when autonomous systems with or without drivers or other autonomous mobility solutions are used. Because for vehicle systems that should decide for themselves which parking space is to be used and, in particular, should also autonomously park in it, the clear distinction between parking options that may be used, and parking options that may not be used is not currently possible. Autonomous automobiles, drones and similar mobile systems may therefore cause dangerous interference with public transport or obstruct the access for rescue service and/or individuals due to missing or incorrect information.

Solutions with cameras also do not allow this clear distinction. For example, signs or other indications of parking restrictions are applied in various ways. Such instructions may, for example, be painted on the road, be attached as a sign on a gate or on a wall, be attached as a text indication under street signs and the like. Nevertheless, such instructions must be recognized as such in any weather and at any time of the day. Camera-based analyzes pose a high risk here, on the one hand with regard to a lack of ambient lighting, and on the other hand with regard to the limitations of the recognition algorithms for traffic signs. Examples of problems are poor light, an oblique viewing angle on the sign, signs placed far away, stickers or graffiti on the signs, the partial occlusion by plant growth, and the like. The use of the ultrasonic sensors can only serve to measure the sufficient size of the candidate parking option. Further information will not be received.

Digital maps can only serve as backup since the map material can be outdated. There is also the risk that motor vehicles that incorrectly report a parking option, distort the map entries and an unauthorized parking space appears in the online data. Construction sites and/or roadblocks that are not reported to or not logged off from the map service, for example, contain further risk potential. This is especially true for day job sites or short-term roadblocks.

SUMMARY

The present disclosure is therefore based on the object of specifying an improved, more reliable option for vehicle systems, to assess candidate parking options with regard to the admissibility of a selection as a parking space.

To solve this problem it is provided according to the present disclosure in a method of the type mentioned above that at least one candidate parking option is associated to a transmitting device on-site or locally, in particular immediately locally, from which the motor vehicle receives the permissibility information describing the permissibility of parking the motor vehicle on the candidate parking option and/or a transitability of at least a portion of a path leading to the candidate parking option, wherein the selection of the parking space to be used is carried out in dependence on the permissibility information.

According to the present disclosure, it is therefore proposed to locally associate transmitting devices, in particular so-called "beacons", to the candidate parking options from which a permissibility information can be obtained which describes to what extent a parking prohibition and/or transit prohibition could be present. The transmitting devices are to be positioned in the vicinity of traffic areas comparable to driveways, no-parking zones or similar parking options, in order to communicate with motor vehicles having corresponding motor vehicle systems and to transmit corresponding permissibility information. The transmitting devices are therefore preferably arranged in direct spatial proximity to the candidate parking option. In particular, provision may be made for the transmitting devices to be arranged at a distance of less than 10 m, in particular less than 5 m, from the candidate parking option with which they are associated. Thus, in particular, the transmitting device has a local transmitting range, which may for example be less than 100 meters in diameter and is substantially centered around the candidate parking option. The transmitting device, in particular the beacon, is therefore not only associated with regard to the information, but also spatially, with the candidate parking option. Preferably, the association can be exclusive, so that each candidate parking option is assigned its own transmitting device. In this way, autonomous mobility systems receive additional information in order to be able to autonomously identify a candidate parking option as a possible parking space in contrast to parking areas, driveways, access roads for fire brigades and the like. There is thus a guaranteed, digitally securable and localized permissibility information for which no additional infrastructure is required in addition to the transmitting devices, since the communication takes place directly via a transponder signal from the transmitting device to the motor vehicle.

The present disclosure can be used particularly expediently when the operation of the motor vehicle is completely automatically guided by the vehicle system in the search for a parking space. In this way, completely autonomous systems, which are specifically activated by the driver, for example, so that the motor vehicle autonomously searches for a parking space and in particular also starts approaching it, can determine whether candidate parking options actually represent permissible parking spaces or not. Thus, the present disclosure allows a complete decoupling of an assessment of the possibly present driver, it being noted that the present disclosure can generally also be applied to other mobile units, which are operated in particular completely driverless, as motor vehicles, for example, drones or the like.

In an advantageous development, it can be provided that a prohibition information describing the section and/or the candidate parking option, to which the permissibility information relates and/or a prohibition information describing a type of a parking prohibition and/or transit prohibition, and/or a validity information describing a temporal and/or factual limitation of the parking prohibition and/or a transit prohibition and/or a permissibility information comprising status information is used. The permissibility information can thus retain a large number of useful partial information, wherein the motor vehicle can derive from a location description which potentially present candidate parking option relates to the permissibility information of a respective transmitting device. Since many parking options are also temporally or objectively regulated, for example, with regard to the nature of the motor vehicles to be parked, it is particularly useful if the permissibility information also contains a validity information. The validity information can therefore describe, for example, to what extent parking is limited in time and the like. It is also expedient if the reason for the prohibition is also communicated, for example, in the form of prohibition information, which describes, in particular, the section and/or the candidate parking option as an area affected by a parking prohibition and/or as a driveway to be kept clear and/or as a construction site area. Finally, the permissibility information can also include status information, for example as a status code, which can indicate, for example, to what extent the transmitting device is active and/or which type of information is contained, so that a motor vehicle can check the relevance of the permissibility information.

Preferably, therefore, it may be provided that the vehicle system evaluates the validity information and/or the status information for a given relevance for the motor vehicle, wherein a further evaluation of the permissibility information takes place only if the relevance is given. In other words, based on the status information and/or the validity information, the vehicle system can decide whether the received message, that is to say the permissibility information, must be further interpreted. By excluding permissibility information in this way, calculation times and/or calculation resources can be saved.

An advantageous embodiment further provides that the permissibility information further describes a size of the candidate parking space and/or a preferred parking position. For example, a variable can be used to understand measurement data of environmental sensors and/or to make a direct comparison as to whether the size is at all sufficient for the motor vehicle. Information about a desired parking position, in particular also including an orientation, can later be used for controlling the stopping operation/parking operation, which is preferably likewise carried out automatically by the vehicle system. Of course, in this regard, the permissibility information may also contain other information useful at a later time, for example, indications on the approach selection and the like.

It should be pointed out at this point that, in addition to the permissibility information, for example, in order to firstly find candidate parking spaces to be checked, in particular parking spots, of course the, in principle, already known information from conventional parking assistance systems can be used. Thus, it can be provided that the candidate parking options are detected and/or measured by means of at least one environmental sensor of the motor vehicle and/or by means of digital map information. If a candidate parking option was detected, then the permissibility information, if it exists in this respect, can be checked to determine whether the candidate parking option is actually suitable as a parking space for the motor vehicle. Furthermore, it may, as already indicated, be expedient if the vehicle system is also designed for at least partially automatic implementation of the parking operation.

Specifically, it can be provided that a candidate parking option that is affected by a parking prohibition and/or a transit prohibition for the motor vehicle is not selected as a parking space. Transit prohibitions for sections of the path which are inevitably traveled on the way to the candidate parking space and/or stopping prohibitions, especially parking prohibitions, can therefore represent exclusion facts by which the candidate parking space is immediately discarded as a possible parking space. Of course, even if validity information relating to a time limit exists, it can also be analyzed more precisely. Thus, it can be provided that, in the presence of a validity information which affects a time limit and of a known or predicted value for the parking time, an exclusion of candidate parking options is checked by comparing the time limit with the parking time. If, for example, it is known from calendar data and/or history data as input data describing the past use of the motor vehicle and/or from a driver input for how long the motor vehicle is expected to be parked, or if such a parking time can be predicted, for example, again on the basis of said input data, it can therefore also be checked whether the time limit is not violated according to the validity information.

It is particularly expedient for a motor vehicle-side communication device to communicate with the transmitting device via the Bluetooth Low Energy standard. This BLE standard has a short but suitable range and requires very little energy, so that energy sources for the transmitting devices can be chosen favorably. In addition, it is a standard for which an interface is already provided in many motor vehicles anyway. Of course, it is also possible to use other transmission standards/transmission methods.

A conceivable embodiment of the present disclosure provides that the transmission of the permissibility information is sent in response to a request signal of the vehicle system sent in particular as a broadcast. For example, it can thus be provided that the motor vehicle or vehicle system emits a request signal, if a candidate parking option was detected by environmental sensors or the like, which is received by transmitting devices in the environment and triggers said devices to send their permissibility information.

However, a preferred embodiment of the present disclosure provides that the permissibility information is transmitted cyclically as a broadcast from the transmitting device. In this way, the transmitting devices, in particular beacons, permanently transmit their permissibility information in a defined transmission cycle. Thus, all motor vehicles in the reception area can use this permissibility information. Up-to-the-minute changes are recorded by motor vehicles. When using a low-energy transmission standard, such as Bluetooth Low Energy, this can be easily implemented even with transmitting devices without their own electrical power connection.

A particularly advantageous embodiment of the present disclosure results when the transmitting device has an internet connection and/or a mobile radio connection and the permissibility information is programmed and/or updated via this. With particular advantage, the transmitting device can therefore be programmed online in order to update information in a highly up-to-date manner and the like. In this way, a further increased reliability of the information is achieved.

Incidentally, the transmitting device can have a battery and/or a solar device and/or a wired electrical connection for supplying energy. It is also conceivable to realize a wired internet connection.

Additionally or alternatively, it is also conceivable to locally program the transmitting devices. Conveniently, this security mechanisms are used to protect against unauthorized access, such as certificates.

In addition to the method, the present disclosure also relates to a motor vehicle, comprising a vehicle system, which is designed for detecting and selecting the parking space to be used from a plurality of candidate parking options, optionally for at least a partially automatic implementation of the parking operation and for carrying out the method according to the present disclosure. All statements relating to the method according to the present disclosure can be analogously transferred to the motor vehicle according to the present disclosure, with which therefore also the already mentioned advantages can be obtained. In particular, the motor vehicle has a communication device for communication with transmitting devices.

Finally, the present disclosure also relates to a transmitting device (beacon), which sends the permissibility information according to the method according to the present disclosure. Such a transmitting device therefore has a transmitting unit for transmitting permissibility information describing a permissibility of parking the motor vehicle on one of the parking options associated to the transmitting device and/or of driving through at least a portion of the path associated to the transmitting device leading to the parking option. The transmitting device thus uses a transmitting unit to transmit the permissibility information wirelessly, in particular by radio using electromagnetic waves, and thus forms a kind of an, in particular exclusively, "electromagnetic traffic sign". In a preferred embodiment, which is specifically tailored to the needs of fully automated driving, the transmission of the permissibility information is the only form of reproduction of traffic information by the transmitting device. It is thus independent of optical and/or acoustic outputs or display means, and it is neither assigned nor does it include such optical and/or acoustic and/or other display means.

All embodiments of the transmitting device, as they have been expressed with respect to the description of the method according to the present disclosure, can of course be analogously transferred to the transmitting device according to the present disclosure. The transmitting device may have a storage unit for storing the permissibility information and/or a control unit for controlling the operation of the transmitting device. The transmitting unit is preferably designed to use a Bluetooth standard, in particular Bluetooth Low Energy. The transmitting device preferably has a remote communication interface, in particular in the internet, and/or a local communication interface. Via the remote communication interface, it is possible to program the transmitting device online, specifically the permissibility information and the type of its broadcast, as already explained above. The control unit can therefore also implement corresponding transmission instructions, for example the cycle of a broadcast, by controlling the transmission unit.

The transmitting device may further comprise a housing which is made of plastic, for example, and/or fastening means for fastening the transmitting device, in particular adjacent or within its validity range. The housing may include tamper protection devices and/or, if there is a wired local communication interface, ports for such. Furthermore, the transmitting device can comprise a connection to an external energy source and/or an internal energy source, in particular a battery.

Such a concept of a transmitting device, in particular in an embodiment in which traffic information is transmitted exclusively by the transmitting unit via radio, can in principle also be transferred to other fields of application, in particular in the field of autonomous driving and/or for other types of traffic information.

BRIEF DESCRIPTION OF THE DRAWINGS

Further advantages and details of the present disclosure will become apparent from the embodiments described below and with reference to the drawings, in which.

DETAILED DESCRIPTION

Figure 1:
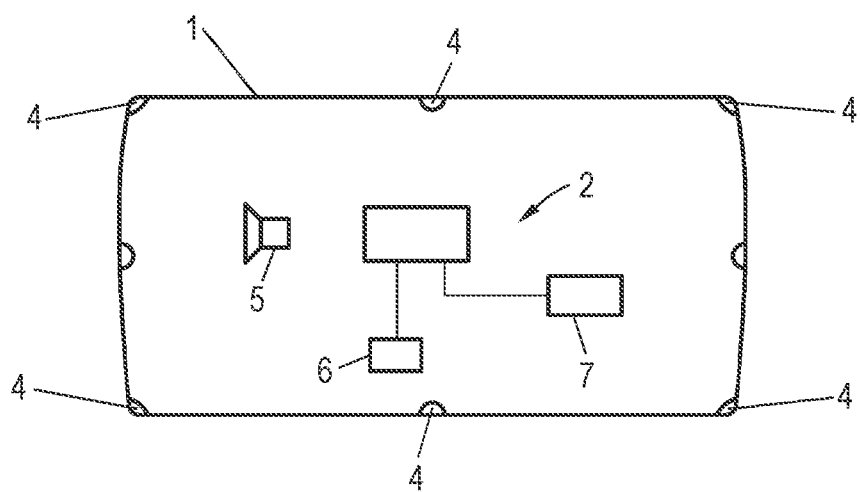
FIG. 1 shows a schematic diagram of a motor vehicle according to example embodiments of the present disclosure.

FIG. 1 is a schematic diagram of a motor vehicle 1 according to the present disclosure. The motor vehicle 1 has a vehicle system 2, which in the present case is designed for a completely autonomous, and thus fully automatic, guidance of the motor vehicle 1, but also acts as a parking assistance system. For this purpose, a control unit processes a multiplicity of input data in order to be able to select a suitable and permissible parking space from candidate parking options in the environment of the motor vehicle 1. In this parking space it is possible to park, in particular, in a fully guided automatic manner.

Input data in this regard firstly originate, as it is known in principle, from environmental sensors of the motor vehicle 1, wherein in the present case ultrasonic sensors 4 and a camera 5 are shown by way of example. These sensor data can be evaluated, for example, as to whether candidate parking options exist in the environment of the motor vehicle, which can also be measured to check whether the motor vehicle 1 can park there. Another source of input data is the navigation system 6 of the motor vehicle 1, in which annotated digital map material can be present or retrieved, which can also give hints on parking options and in some embodiments may even contain information about whether the parking option is currently occupied. However, a further source of input data in the present case is also a communication device 7, which can receive data from transmitting devices associated to candidate parking options. These are permissibility information, which may contain a variety of different pieces of information that are useful, but in particular indicate whether the motor vehicle is allowed to park on the candidate parking option and/or whether access to the candidate parking option is allowed.

In the present case, the permissibility information comprises a location description of the area comprising the portion of the path and/or the candidate parking space with which it is associated. For example, the location description may describe the extent of a no-parking or no-stopping zone. Furthermore, the permissibility information, which is received by the transmitting device, includes prohibition information, which describes a kind of a parking prohibition and/or transit prohibition, as well as a validity information, which describes a temporal and/or factual limitation of the parking prohibition and/or the transit prohibition. In expedient embodiments, the permissibility information may also contain status information, a size of the candidate parking option and a preferred parking position of the motor vehicle on the candidate parking option and, if required, further additional partial information that may also be useful for a parking operation.

Figure 2:
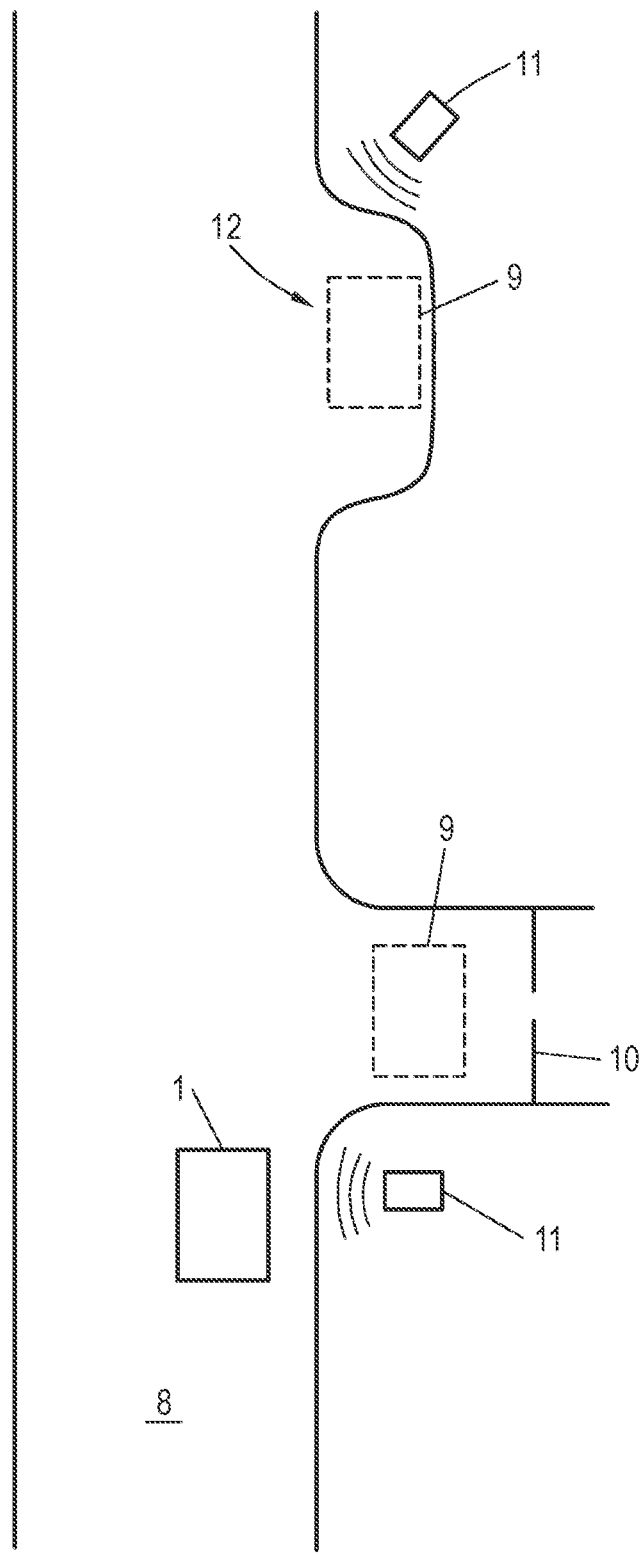
FIG. 2 shows a traffic situation according to example embodiments of the present disclosure.

FIG. 2 explains the sequence of the method according to the present disclosure on the basis of an exemplary traffic situation in which the motor vehicle 1 is located. The motor vehicle 1 is currently traveling on a road 8 and is in an operating mode in which the motor vehicle 1 is operated fully automatically in search of a parking space for the motor vehicle 1. In this case, with its environment sensors 4, 5 shown, it will, in principle, recognize the free, potential candidate parking options 9 on which there is currently no further motor vehicle. Also by the dimensions, the motor vehicle 1 could definitely select the candidate parking options 9 as a parking space. However, as can be seen in FIG. 2, the front of the candidate parking options 9 is an entrance to a gate 10 in which the motor vehicle 1 should not be parked. The rear parking option 9 is indeed in a parking bay, for which, however, time limitations of the parking permit (and thus also of a parking prohibition) exist.

In order to provide this information to the motor vehicle 1 in a highly up-to-date and reliable manner, the candidate parking options 9 are each associated to transmitting devices 11 according to the present disclosure, which transmit their respective permissibility information via broadcast in the Bluetooth Low Energy standard. In addition to the location description which allows the vehicle system 2 of the motor vehicle 1 to assign the permissibility information to the candidate parking space 9, the permissibility information regarding the front candidate parking space 9 contains the indication that parking is, in principle, not possible there due to a permanently used access. However, the validity information may describe that a temporary parking for rescue vehicles and the like is allowed; however, the motor vehicle 1 is not such a vehicle.

Also, the permissibility information regarding the rear candidate parking space includes validity information correspondingly describing the periods in which parking is possible there.

When analyzing whether the front candidate parking option 9 should be selected as a parking space, the motor vehicle 1 or, more specifically, the vehicle system 2 initially processes the status information, if any, which, however, describes the permissibility information as absolutely relevant for the motor vehicle 1. Should something be received from transmitting devices 11 of a different type, the processing of the information transmitted by this device can be aborted immediately.

Then, the validity information is analyzed. Since the motor vehicle 1 is not a rescue vehicle, the vehicle system 2 recognizes immediately that a further analysis of the permissibility information would not make sense here, since the parking of the motor vehicle 1 in the front candidate parking option would in principle be prohibited anyway. The front parking option 9 is therefore discarded as a parking space.

With regard to the rear candidate parking space 9, the validity information will again be checked, in which case a previously known or predicted parking time for which the motor vehicle 1 is expected to remain there is taken into account, in order to correctly consider the time limits. In the present case, the motor vehicle should be parked in a period in which the parking is in principle allowed there, for a parking time that is still within the permitted period and that does not exceed a maximum parking time, so that the rear candidate parking option 9 is selected as destination parking space 12. The vehicle system 2 then performs the parking operation completely automatically.

It should also be noted at this point that the transmitting devices 11 in the present case can each be addressed via an internet connection. This means they can be programmed online, for example, with a necessary update of the reliability information, so that it can always be kept up-to-date. The transmitting devices 11 may further comprise a continuous electrical power connection to operate corresponding transponders built in them, which cyclically broadcast the reliability information.

The invention claimed is:

1. A method for operating a motor vehicle, wherein the motor vehicle comprises a vehicle system which is formed for detecting and selecting a parking space, the method comprising:

operating, by the vehicle system, the motor vehicle in a search for a parking space, the operating occurring in a completely autonomous manner;

receiving, by the motor vehicle, from a transmitting device, permissibility information associated with a candidate parking space, wherein the motor vehicle receives the permissibility information directly from the transmitting device via short range wireless signals, wherein the candidate parking space is locally and exclusively associated with the transmitting device, such that the transmitting device is assigned to the candidate parking space and cyclically broadcasts the permissibility information only for the candidate parking space within a local transmitting range positioned on the candidate parking space, and wherein the permissibility information describes a permissibility of at least one of parking the motor vehicle in the candidate parking space, or driving through at least a section of a path leading to the candidate parking space;

detecting, by the vehicle system, the candidate parking space in an environment of the motor vehicle based on at least one environmental sensor of the motor vehicle;

in response to the detecting, accessing, by the vehicle system, the permissibility information associated with the candidate parking space; and evaluating, by the vehicle system, the permissibility information to determine a relevance of the candidate parking space for the motor vehicle;

in response to determining that the candidate parking space is relevant to the motor vehicle, further evaluating, by the vehicle system, the permissibility information, wherein the vehicle system is configured to further evaluate the permissibility information only when it is determined that the candidate parking space is relevant to the motor vehicle, the further evaluation being prevented if the vehicle system determines from the initial evaluation of the permissibility information that the candidate parking space allows parking only for a rescue vehicle and the motor vehicle is not a rescue vehicle;

selecting, by the vehicle system, the candidate parking space for parking by the motor vehicle based at least in part on the further evaluation of the permissibility information.

2. The method according to claim 1, wherein the permissibility information comprises prohibition information that describes at least one of a parking prohibition or a transit prohibition associated with the candidate parking space, validity information, status information describing a temporal or factual limitation of the parking prohibition, or a driving prohibition.

3. The method according to claim 2, wherein the prohibition information describes the section or the candidate parking space as an area affected by parking prohibition, as a driveway to be kept free, or as a construction site area.

4. The method according to claim 2, wherein the permissibility information further describes at least one of a size of the candidate parking space, or a preferred parking position.

5. The method according to claim 2, further comprising rejecting, by the vehicle system, the candidate parking space based at least in part on the prohibition information.

6. The method according to claim 5, wherein the validity information describes a time limit and a previously known or predicted value of a parking time at which the motor vehicle will park, and wherein the method further comprises discarding, by the vehicle system, the candidate parking space based on a comparison of the time limit and the parking time.

7. The method according to claim 1, further comprising communicating, by a communication device of the motor vehicle, with the transmitting device via Bluetooth Low Energy communications.

8. The method according to claim 1, further comprising broadcasting, by the vehicle system, a request for the permissibility information, and wherein the transmitting device provides the permissibility information in response to the request.

9. The method according to claim 1, wherein the transmitting device has at least one of an internet connection or a mobile radio connection, and wherein the permissibility information is programmed or updated via the at least one of the internet connection or the mobile radio connection.

10. A motor vehicle comprising:

a vehicle system comprising a control unit configured to operate the motor vehicle in a search for a parking space, the operating occurring in a completely autonomous manner;

wherein the motor vehicle is configured to:

receive, from a transmitting device, permissibility information associated with a candidate parking space, wherein the motor vehicle receives the permissibility information directly from the transmitting device via short range wireless signals, wherein the candidate parking space is locally and exclusively associated with the transmitting device, such that the transmitting device is assigned to the candidate parking space and cyclically broadcasts the permissibility information only for the candidate parking space within a local transmitting range that is positioned on the candidate parking space, and wherein the permissibility information describes a permissibility of at least one of parking the motor vehicle on the candidate parking space, or driving through at least a section of a path leading to the candidate parking space;

detect, by the control unit, the candidate parking space in an environment of the motor vehicle based on at least one environmental sensor of the motor vehicle;

in response to the detecting, access, by the control unit, the permissibility information associated with the candidate parking space; and evaluate, by the control unit, the permissibility information to determine a relevance of the candidate parking space for the motor vehicle;

in response to determining that the candidate parking space is relevant to the motor vehicle, further evaluate, by the control unit, the permissibility information, wherein the control unit is configured to further evaluate the permissibility information only when it is determined that the candidate parking space is relevant to the motor vehicle, the further evaluation being prevented if the vehicle system determines from the initial evaluation of the permissibility information that the candidate parking space allows parking only for a rescue vehicle and the motor vehicle is not the rescue vehicle;

select, by the control unit, the candidate parking space for parking by the motor vehicle based at least in part on the further evaluation of the permissibility information.

11. The motor vehicle of claim 10, wherein the transmitting device is configured to emit the permissibility information.

* * * * *